Patented May 20, 1952

2,597,430

UNITED STATES PATENT OFFICE 2,597,430

NITRIC ACID AND BISULFITE DIGESTION OF FIBROUS VEGETABLE MATERIAL

Gilbert Baudinière, Paris, France

No Drawing. Application July 30, 1947, Serial No. 764,929. In France December 22, 1943

Section 1, Public Law 690, August 8, 1946
Patent expires December 22, 1963

3 Claims. (Cl. 92—9)

Various methods of treatment of vegetable materials by means of nitric acids in combination with suitable lyes, have already been suggested. But they are very expensive both in view of the high consumption of nitric acid and of the high costs caused by the recovery of the acid retained by the vegetable matter that leaves the bath of treatment and which is carried along by the washing waters.

The object of the present invention is to provide a method applicable to all fibrous vegetable materials and which permits of obtaining a considerable economy over known methods, owing in particular to the formation of some valuable chemical products.

My method includes a succession of operations intended:

a. To subject the vegetable material to the action of a nitric acid solution;

b. To neutralize by means of a base the nitric solution retained by the vegetable matter;

c. To disincrust, by means of a bisulfite lye, the non-cellulosic elements of the vegetable material, made soluble by the preceding treatment.

a. According to my invention, the vegetable material, suitably cut into pieces, is treated first by a nitric acid solution the strength of which varies according to the nature of the vegetable material, and to the pressure, temperature and duration conditions of the treatment. For practical purposes the operation is carried out at atmospheric pressure and in this case the temperature must range from 60–80° C. at most.

In order to obtain the highest yield as well as the best quality of cellulose it is advisable to work at a temperature as low as possible, in view of the duration of cooking, which should be short. The acid solution should be of a strength ranging from 8° Bé. for a vegetable material of low density, very finely divided, and consequently capable of being quickly impregnated with acid, to 20° Bé. for a vegetable material of high density and which is more difficult to impregnate. By working in this way, it is possible to obtain a satisfactory cooking in less than one hour of treatment the vegetable material being heated during this time from ordinary temperature to a maximum temperature of 70–75° C.

This treatment may eventually be preceded by another treatment intended to facilitate or to improve the action of the subsequent treatments: washing in hot or cold water, in steam, in an alkaline lye etc. It may also be followed by the same washing operation in water or steam in order to eliminate the maximum amounts of treatment solution and of soluble products.

b. As soon as the desired maximum temperature is reached, the acid retained (both by impregnation and by superficial physical adhesion) by the vegetable material freed from its acid solution, is neutralized by an alkaline or alkali-earth base. This second treatment can be carried out at atmospheric pressure either in the cold or the hot state; its duration is determined by the necessity of fully neutralizing the acid and it depends, as a matter of fact, upon the nature of the vegetable material, the temperature of treatment and the concentration of the nitric solution that is used. This concentration will be such that after neutralization of the acid, the bath is to be alkaline. In these conditions the duration of the treatment at a temperature of about 50°–100° C. ranges from 10 to 60 minutes according to the vegetable material that is treated.

The base that is employed is either soda or lime. I then obtain as main salts:

A soluble nitrate of sodium or calcium;

An oxalate produced by the action of the base on oxalic acid resulting from reaction of nitric acid upon the incrustations of the vegetable material and which, according to the nature of the base, will be either a soluble sodium oxalate or an insoluble calcium oxalate.

This second treatment may also be followed by washing operations in hot or cold water or in steam with a view to eliminating the maximum amount of treatment solution and of soluble products.

c. Freed from its alkaline lye the vegetable material still contains (due to physical adhesion) a small amount of base and of the salts that have been formed.

It then undergoes the third treatment by means of a bisulfite lye, which is preferably of alkali-earth nature if the neutralization base was alkaline, or alkaline if the base was of alkali-earth nature. This disincrustation treatment may be carried out either at atmospheric pressure or at a higher pressure either in the hot or in the cold state; its duration depends upon the degree of cooking of the vegetable material after the first treatment, and upon the temperature and pressure of treatment and the concentration of the lye that is utilized. This concentration will be such that the lye can react upon the whole of the nitrates that are carried along and dissolve the incrustations of the vegetable material, which have been nitrated in the course of the first treatment and made soluble by the second one.

When working at atmospheric pressure and boiling temperature the duration of this third treatment may range from one quarter of an hour to five hours according to the degree of nitric cooking and the nature of the vegetable material. When the vegetable material is disincrusted the lye is evacuated and the cellulose paste is washed in water, defibered, purified and bleached at will according to the usual method.

The insoluble calcium oxalate produced during the second treatment is eliminated either physically through known methods: sanding, centrifugating etc., or chemically by washing with a slightly acidulated solution for instance of nitric acid, which transforms calcium oxalate into oxalic acid and a soluble salt such for instance as calcium nitrate; this washing may be followed by a washing in water or with a dilute solution of a base such as soda for neutralizing the nitric acid that might remain in the paste. I may also combine the physical and chemical means.

The lyes that have been used for these three treatments may, after being restored to their strength, be again utilized. As they are being reemployed, the impurities coming from the reactions, in particular calcium oxalate, concentrate and their elimination by decantation or otherwise will be facilitated.

Industrial exploitation of the method which has just been described gives rise, as above stated, to the formation of very interesting products.

In the course of the second treatment, the basic reaction: soda or lime upon the nitric acid retained by the vegetable material causes the formation of sodium or calcium nitrates and oxalates. Under the action of the bisulfites (third treatment) these nitrates are transformed according to the reversible reaction:

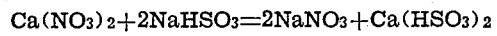

$$Ca(NO_3)_2 + 2NaHSO_3 = 2NaNO_3 + Ca(HSO_3)_2$$

For instance, if the base that is employed is lime, the reaction yields calcium nitrate which is subsequently transformed by the action of sodium bisulfite into sodium nitrate, which can be sold. Calcium bisulfite remains which can be stored up to be utilized in the course of subsequent treatments.

As a matter of fact, when there is a sufficient stock of calcium bisulfite, it is possible to treat (second treatment) the vegetable material cooked with nitric acid, no longer with lime, but with soda which will give sodium nitrate on which the precedingly manufactured and stored calcium bisulfite will be caused to react during the third treatment; I will thus obtain calcium nitrate, which can be sold. The sodium bisulfite manufactured at this time may be stored up for use in subsequent treatments.

Therefore it will be seen that, except for the small amounts necessary for compensating those consumed during the treatment, the first amount of bisulfite can be constantly reused, under one form or the other; it suffices for this purpose to make use alternately of calcium and sodium for the second treatment. On the other hand, it is known that the nitrates of these bases constitute a high value fertilizer.

Thus, the method according to my invention no longer includes costly recuperations of nitric acid carried away by the washing waters. There is but to store up the bisulfites either of sodium or of calcium and to purify them at intervals of time by eliminating, in particular by decantation, calcium oxalate and other matters.

The invention is further illustrated by the following example which, of course, has no limitative character.

100 kgs. of wheat straw dried in air, suitably cut and freed from dust, are placed in 1200 liters of an acid solution containing about 200 kgs. of $NO_3H$; the temperature is gradually raised and in the course of one hour the temperature reaches 70–75° C. After this treatment, the straw has retained and partly transformed about 25 kgs. of $NO_3H$; the reaction has given, among other products, a small amount of oxalic acid.

In order to make sure that the free acid that has been retained is fully neutralized, and in order to render the mass alkaline, it is then necessary to employ about 20 kgs. of lime diluted in 1200 liters of water; after one quarter or an hour at 50° C., I obtain about 40 kgs. of soluble calcium nitrate, and about 1 kg. of insoluble calcium oxalate is formed. This lime lye, when evacuated, carries along a great part of these salts, and there remains in the straw that has been treated but about 2,500 kgs. of calcium nitrate, and a small amount of calcium oxalate.

For the third treatment, I employ 1200 liters of a 2.5% sodium bisulfite lye, which reacts upon calcium nitrate and dissolves the nitrated incrustations of straw made soluble by the second treatment. After about one hour of treatment, at boiling temperature and under atmospheric pressure, the straw is disintegrated; the lye is then evacuated and the paste is defibered washed, purified and bleached through the known means. I thus obtain a bleached cellulose of very good quality, containing about 83% of alpha cellulose.

The yield of air dried cellulose is about 50 kgs. in the case of unbleached cellulose and 45 kgs. in the case of bleached cellulose.

What I claim is:

1. The method of treating a fibrous vegetable material which comprises wetting said material with a nitric acid aqueous solution of a concentration ranging from 8 to 20° Bé. at atmospheric pressure and at a temperature ranging from 60 to 80° C., draining off the acid solution not retained, either chemically or physically, by said vegetable material, adding a solution of a base of the group constituted by calcium and sodium bases to neutralize the nitric acid physically retained by the vegetable material, draining off the liquor, which contains in solution the nitrate thus formed and collecting it, and treating the remaining cellulosic material with an alkali bisulfite lye under pressure and temperature conditions suitable to remove incrustations.

2. The method of treating a fibrous vegetable material which comprises wetting said material with a nitric acid aqueous solution of a concentration ranging from 8 to 20° Bé. at atmospheric pressure and at a temperature ranging from 60 to 80° C., draining off the acid solution not retained, either chemically or physically, by said vegetable material, adding a calcium base solution to neutralize the nitric acid physically retained by the vegetable material, draining off the liquor, which contains in solution the calcium nitrate thus formed and collecting it, and treating the remaining cellulosic material with an alkali bisulfite lye under pressure and temperature conditions suitable to remove incrustations.

3. The method of treating a fibrous vegetable material which comprises thoroughly impregnating said material with a nitric acid aqueous solution of a concentration ranging from 8 to 20° Bé. at atmospheric pressure and at a temperature ranging from 60 to 80° C., draining off the acid solution not retained, either chemically or physically, by said vegetable material, adding a lime solution to neutralize the nitric acid physically retained by the vegetable material, draining off the liquor which contains in solution the calcium nitrate thus formed and collecting it, and treating the remaining cellulosic material with a sodium bisulfite lye under pressure and temperature conditions suitable to remove incrustations.

GILBERT BAUDINIÈRE.

REFERENCES CITED

The following references are of record in the file of this patent:

UNITED STATES PATENTS

| Number | Name | Date |
|---|---|---|
| 1,528,218 | Leaver | Mar. 3, 1925 |
| 1,581,671 | Bradley | Apr. 20, 1926 |
| 1,813,531 | Boistesselin | July 7, 1931 |
| 1,816,136 | Acree | July 28, 1931 |
| 1,840,162 | Heimann | Jan. 5, 1932 |
| 1,987,195 | Kipper | Jan. 8, 1935 |
| 2,074,339 | Miles | Mar. 23, 1937 |

OTHER REFERENCES

Paper World, June 1939, pp. 335 to 343.